(12) United States Patent
Hahn et al.

(10) Patent No.: US 11,384,861 B2
(45) Date of Patent: Jul. 12, 2022

(54) VALVE UNIT FOR DOSING FLUIDS, VALVE ASSEMBLY WITH VALVE UNIT AND METHOD FOR TESTING A CLOSED CONDITION OF A VALVE UNIT

(71) Applicant: BUERKERT WERKE GMBH & CO. KG, Ingelfingen (DE)

(72) Inventors: Thomas Hahn, Ingelfingen (DE); Florian Fischer, Ingelfingen (DE)

(73) Assignee: BUERKERT WERKE GMBH & CO. KG

( * ) Notice: Subject to any disclaimer, the term of this patent is extended or adjusted under 35 U.S.C. 154(b) by 47 days.

(21) Appl. No.: 16/900,573

(22) Filed: Jun. 12, 2020

(65) Prior Publication Data

US 2020/0393061 A1 Dec. 17, 2020

(30) Foreign Application Priority Data

Jun. 13, 2019 (DE) ...................... 10 2019 116 161.4

(51) Int. Cl.
| | |
|---|---|
| *F16K 37/00* | (2006.01) |
| *F16K 21/16* | (2006.01) |
| *F16K 25/00* | (2006.01) |
| *F16K 1/42* | (2006.01) |
| *F16K 1/36* | (2006.01) |

(52) U.S. Cl.
CPC .......... *F16K 37/0041* (2013.01); *F16K 21/16* (2013.01); *F16K 1/36* (2013.01); *F16K 1/427* (2013.01); *F16K 25/005* (2013.01)

(58) Field of Classification Search
CPC ........ F16K 37/0041; F16K 1/36; F16K 1/427; F16K 25/005
See application file for complete search history.

(56) References Cited

U.S. PATENT DOCUMENTS

| 9,810,346 B2 | 11/2017 | Scherer et al. | ......... F16K 37/00 |
| 11,112,026 B2 * | 9/2021 | Sugiura | ..................... G01F 1/64 |
| 2002/0011581 A1 | 1/2002 | Cronimus | ............... F16K 31/02 |
| 2020/0124759 A1 | 4/2020 | Sugiura et al. | .......... G01V 3/02 |

FOREIGN PATENT DOCUMENTS

| DE | 2057590 | 6/1971 | |
| DE | 3512533 | 10/1986 | .............. G01M 3/40 |
| WO | WO2015078568 | 6/2015 | .............. F16K 37/00 |
| WO | WO-2019093329 A1 * | 5/2019 | .............. B60T 8/363 |
| WO | WO2019093331 | 5/2019 | .............. G01F 1/00 |

* cited by examiner

*Primary Examiner* — Eric Keasel
(74) *Attorney, Agent, or Firm* — Hayes Soloway P.C.

(57) ABSTRACT

A valve unit for dosing fluids is specified, which has a fluid housing including a valve seat, a fluid channel, which extends from a fluid inlet to the valve seat and from the latter to a fluid outlet, a movably mounted valve closing body for controlling or regulating a flow through the fluid channel, and a first electrode and a second electrode, wherein the first electrode is arranged in the fluid channel upstream of the valve seat and the second electrode is arranged in the fluid channel downstream of the valve seat, wherein a distance of the two electrodes from each another is at most 3 mm and/or a maximum distance of the individual electrodes from the valve seat is at most 1.5 mm. Furthermore, a valve assembly and a method of checking a closed state of a valve unit are specified.

18 Claims, 5 Drawing Sheets

VALVE UNIT FOR DOSING FLUIDS, VALVE ASSEMBLY WITH VALVE UNIT AND METHOD FOR TESTING A CLOSED CONDITION OF A VALVE UNIT

FIELD OF THE INVENTION

The invention relates to a valve unit for dosing fluids, to a valve assembly having a valve unit, and to a method of checking a closed state of a valve unit.

BACKGROUND

When dosing fluids in sensitive areas, for example in medical technology, where expensive reagents are often used, reliable closing of a valve unit is particularly important. Leaking, dripping valve units can cause considerable damage, for example if reagents leak or become contaminated due to a leaking valve unit. It is therefore very important to be able to detect any leakage.

When dosing fluids having a sufficiently high ion concentration, leakage can be determined on the basis of the conductivity of a fluid.

For fluids having a low ion concentration, however, the known measuring methods fail due to the low conductance of the fluid.

It is therefore an object of the present invention to ensure a particularly reliable detection of a leakage, both when dosing fluids having a high ion concentration and fluids having a low ion concentration, in particular deionized fluids.

SUMMARY

The present invention provides a valve unit for dosing fluids, having a fluid housing which includes a valve seat, a fluid channel which extends from a fluid inlet to the valve seat and from the latter to a fluid outlet, a movably mounted valve closing body for controlling or regulating a flow through the fluid channel, and a first electrode and a second electrode, the first electrode being arranged in the fluid channel upstream of the valve seat and the second electrode being arranged in the fluid channel downstream of the valve seat, a distance between the two electrodes from each other being at most 3 mm and/or a maximum distance of the individual electrodes from the valve seat being at most 1.5 mm.

If, for example, the valve unit no longer closes reliably due to the occurrence of wear of the valve closing body or due to any other defect, and a leakage is produced, a potential difference occurs at the valve seat. This potential difference is limited to a small area directly adjacent to the valve seat.

In case of a pressure-driven flow with slightly conductive fluids across a valve seat, such a potential difference occurs in particular if an occurring gap is small enough. This is due to the fact that the amplitude of the potential difference depends on the wall potential of the solid body at the valve seat and on the path length over which the wall potential drops. When the valve unit is in a maximum open state, the fluid flows unhindered via the valve seat. Due to the relatively large cross-section in the open state of, for example, 0.8 mm to 2 mm, the ions in the middle of the channel do not experience any electrostatic repulsion by the wall potential of the channel walls and can pass through the valve seat without being hindered. In this case, no so-called flow potential is formed. If the valve is completely closed, no potential difference occurs, either.

A potential difference across the valve seat occurs in particular if an electrical double layer due to the wall potential of the channel walls is larger or similar to the gap at the valve seat. The so-called Debye length of the electrical double layer is the length of the path from the channel wall into the fluid in which the electrostatic field of the channel walls acts on the charge carriers present in the fluid. In deionized water, the ion concentration is particularly low due to the few ions present. This causes the wall potential and thus an electrostatic repulsion to reach several 100 µm into the fluid. In fluids having a higher ion concentration, this path length is only 1 nm to 2 nm.

Typically, leakage at the valve seat is caused by a gap of a few micrometers. The gap is then smaller than the described Debye length, and a potential difference is formed above the valve seat in the fluid under pressure-driven flow. This potential difference can be measured.

The potential difference occurs because even in deionized fluids, a small amount of charge carriers is present, for example hydroxide ions, hydronium ions, carbonate (dissolved $CO_2$) and/or impurities due to salts. In the event of a leakage, when a gap that occurs is particularly small, charge carriers having the same polarity as the channel walls accumulate on the valve seat, thus creating the potential difference in the fluid. The resulting potential difference in the fluid above the valve seat is called flow potential. The accumulation of the charge carriers having the same charge occurs in particular due to electrostatic interactions at the interface of the fluid housing and charge carriers in the fluid.

Due to the proximity of the electrodes to the valve seat, this potential difference can be measured. For this purpose, a voltage measuring device can be connected between the first and the second electrode.

In this way, a leakage of a valve unit can be detected in a particularly reliable manner.

The invention is used in particular for miniature valve units the actuators of which have a width of 6 mm to 10 mm.

If the fluid to be dosed has a sufficiently high ion concentration, leakage can also be detected by conductance measurement. For this purpose, it is merely necessary to connect a suitable measuring device, in particular a conductivity measuring device.

The distance between the electrodes can be less than 1 mm, preferably less than 0.8 mm.

The distance between the electrodes is in particular measured along a flow path of the fluid.

A minimum distance between the two electrodes is preferably 0.3 mm, in particular 0.5 mm. A contact between the electrodes due to positional tolerances of the electrodes is thus reliably prevented.

According to one embodiment, the valve unit has a metallic fluid connection arranged at the fluid inlet, the fluid connection forming the first electrode. Such fluid connections are usually made of metal. Therefore, the fluid connection can serve as an electrode without further modification, and the structure of the valve unit can be kept simple.

For example, the fluid connection protrudes into the fluid housing and ends at a maximum of 1.5 mm upstream of the valve seat. This allows the required maximum distance between the first and the second electrode to be reliably maintained.

In order to be able to position the second electrode in a reliable manner, the fluid housing comprises a recess for receiving the second electrode. In particular, the recess is shaped such that the second electrode can be inserted with a positive fit.

Instead of subsequently attaching the electrodes to the fluid housing, the first electrode and/or the second electrode can be firmly integrated into the fluid housing as inserts. For example, the first electrode and/or the second electrode can be insert-molded. In this way, assembly of the valve unit can be simplified, as the electrodes do not have to be attached when the valve unit is assembled. The positioning accuracy when positioning the electrodes can also be improved, as positional tolerances are smaller when the electrodes are insert-molded than in a mounting thereof after manufacture of the fluid housing.

Preferably, the valve unit has a contact element for contacting the first and/or the second electrode, which extends from the electrode to an outside of the valve unit. Preferably, the contact element protrudes a little beyond the outside of the valve unit. In this way, the electrodes can be easily integrated into an electrical circuit.

According to one embodiment, the second electrode surrounds the valve seat. It is thus possible to detect a leakage in a reliable manner, regardless of the direction in which the fluid exits the valve seat in an undesirable way.

The areas of the fluid housing which are contacted by a medium are preferably made of an electrically non-conductive material which has a wall potential non equal to zero, in particular a negative wall potential. Such plastics are for example PMMA, nylon or polyamides. Due to a wall potential of the areas of the fluid housing contacted by a medium which is not equal to zero, a sufficiently strong potential can develop when the same fluid is used. In particular, the greater the amount of the wall potential, the stronger the potential occurring in the event of a leakage.

Alternatively or additionally, the areas of the fluid housing which are contacted by a medium can be made of a glass-fiber reinforced plastic. This has the advantage that neutrally charged plastics can also be used. Glass fibers cause a strong negative surface charge, which favors the development of a potential difference.

The object is further achieved by a valve assembly having a valve unit, which is configured as described above, and a voltage measuring device, which is connected in an electrical circuit between the first electrode and the second electrode. By means of such a valve assembly, a low-cost measuring system for leakages can be realized, which also works reliably for solutions having low conductivities of less than 500 µS/cm, in particular of less than 50 µS/cm. The valve assembly does not require any complex additional electronics. In particular, only a circuit for voltage measurement is required, the application of an external voltage as is necessary for measuring conductivity can be omitted. However, this does not exclude the possibility of applying a voltage to measure conductivity.

The object is further achieved by a method of checking a closed state of a valve unit, which is configured as described above, when dosing fluids having an electrical conductivity of less than 500 µS/cm, in particular of less than 50 µS/cm, a voltage being measured between the two electrodes of the valve unit, and a leakage of the valve being derived from the measured voltage.

In particular, a potential difference between a fluid inlet and the fluid outlet is measured.

DETAILED DESCRIPTION

Figure 1:
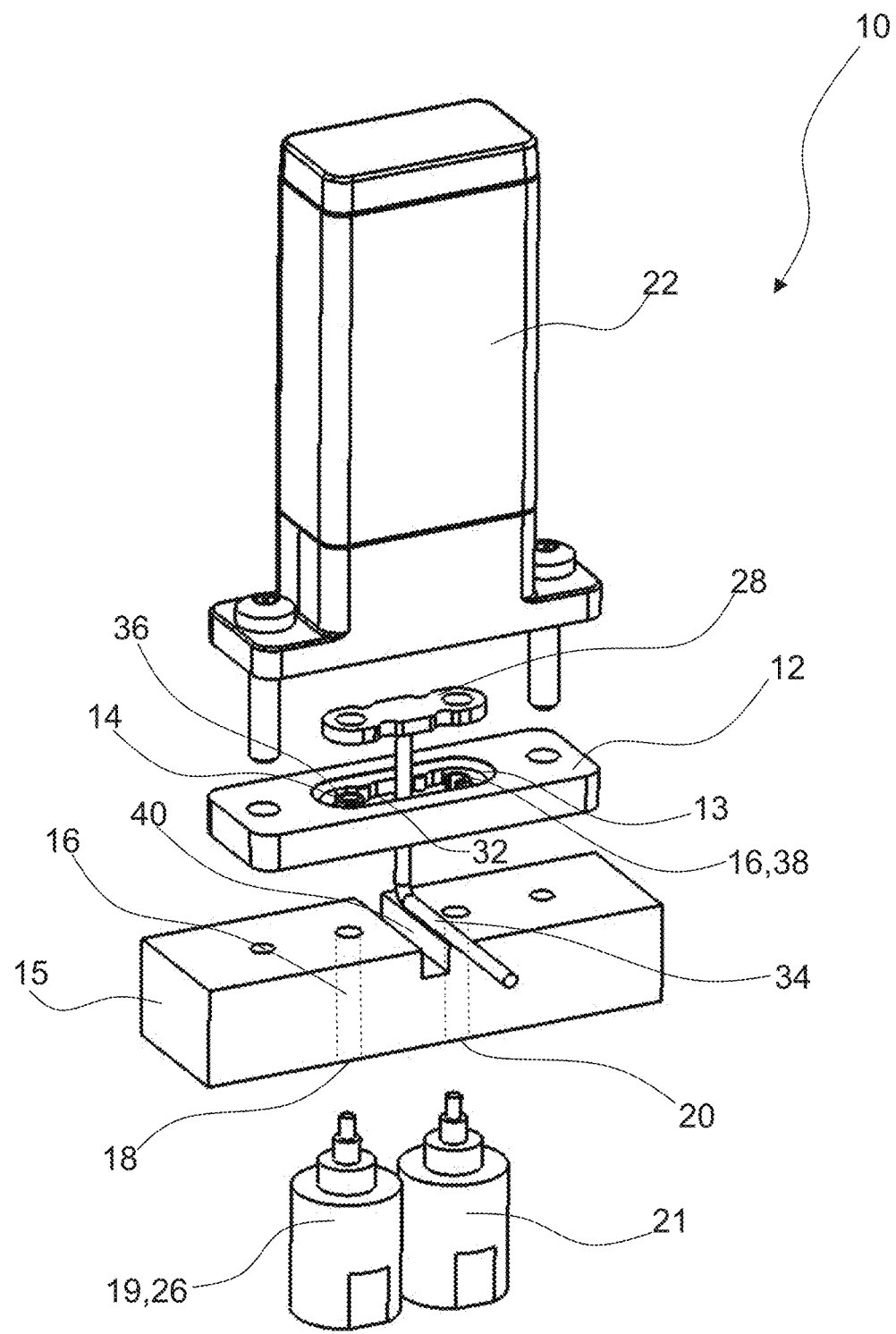
FIG. 1 shows a valve unit according to the invention in an exploded view.

FIG. 1 shows a valve unit 10 for dosing fluids, for example medical reagents, in an exploded view.

The valve unit 10 comprises a fluid housing 12 having a valve seat 14. The valve seat 14 is preferably integrally formed in the fluid housing 12.

The valve seat 14 is preferably arranged within a recess 13 in the fluid housing 12.

A section of a fluid channel 16 which runs from a fluid inlet 18 to the valve seat 14 and from the latter to a fluid outlet 20 extends in the fluid housing 12.

In the valve unit 10 illustrated in FIG. 1, the fluid housing 12 is mounted on an additional flanged housing 15. In the flanged housing 15, the fluid channel 16 is continued such that the fluid inlet 18 and the fluid outlet 20 are located on the flanged housing 15.

The embodiment illustrated in FIG. 1 shows the flanged housing 15 for a valve unit 10. In practice, however, dosing processes often require several valve units 10 to dose different reagents. In this case, the flanged housing 15 is usually enlarged so that several valve units 10 can be mounted on a one-piece flanged housing 15.

The flanged housing 15 thus enables easier installation of the valve unit 10 in a dosing system.

However, it is basically also conceivable to form the flanged housing 15 in one piece with the fluid housing 12.

A respective fluid connection 19, 21 is connected to the fluid inlet 18 and to the fluid outlet 20.

For opening and closing the valve unit 10, a drive unit 22 is provided, which is a solenoid drive, for example. Such drive units 22 for the miniature valves usually have a width of 6 mm to 10 mm, measured here into the drawing plane.

Figure 2:
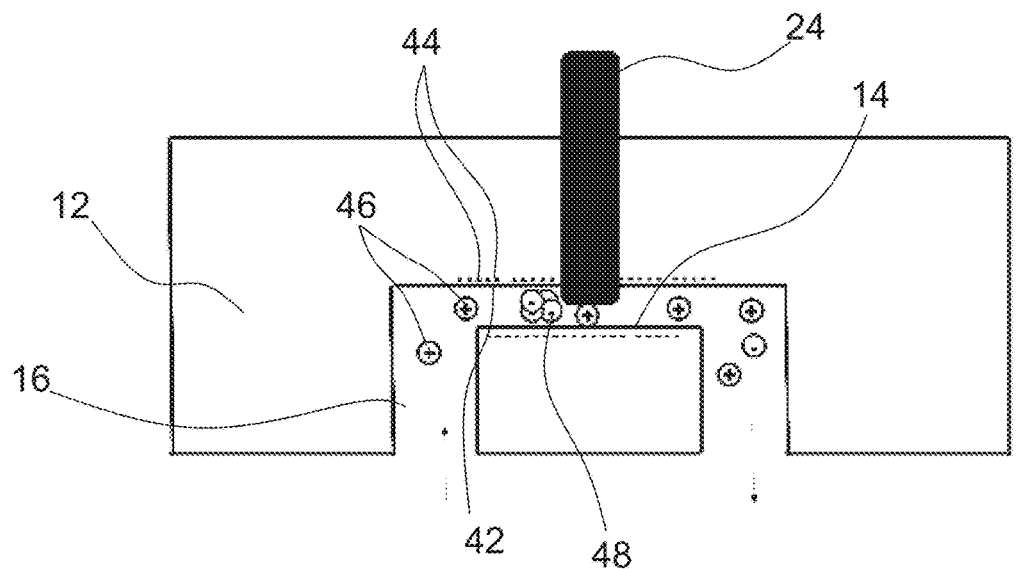
FIG. 2 schematically shows the principle of the source of a potential difference, FIG. 3 schematically shows a structure of the valve unit in the area of the valve seat, FIG. 4 schematically shows the measuring principle used in the valve unit according to the invention.

The drive unit 22 is coupled with a valve closing body 24 which is not visible in FIG. 1. However, it is illustrated in FIG. 2.

The valve closing body 24 controls or regulates a flow through the fluid channel 16. In the closed state of the valve unit 10, the valve closing body 24 sits on the valve seat 14 and thus prevents a fluid flow through the fluid channel 16.

In the open state of the valve unit 10, the valve closing body 24 is lifted from the valve seat 14 by means of the drive unit 22, so that a fluid flow through the fluid channel 16 can take place for the purpose of dosing.

Ideally, only the two aforementioned states occur, namely completely closed or purposefully opened for dosing purposes.

However, it may also happen that the valve unit 10 or the valve closing body 24 does not close properly, for example due to the occurrence of wear, production errors, etc.

In this case, a gap at the valve seat 14 or a leakage occurs in the maximum closed state of the valve unit 10. This is disadvantageous as in this case, a fluid to be dosed, even if only in small quantities, can run or drip unhindered out of the fluid channel 16. Since the fluids to be dosed are often very expensive reagents, even small quantities of fluid that are lost can cause financial damage. There is also the risk that foreign bodies can enter the fluid through the gap and contaminate the fluid.

In practice, it is very difficult to detect such a leakage, as the valve units 10 are sometimes very small and the valve seat 14 is not visible even in the mounted state of the valve unit 10. The quantities of fluid that escape in the event of a leakage are also very small and difficult to detect with the naked eye.

Therefore, according to invention, a leakage is detected by measuring a potential difference between the fluid inlet 18 and the fluid outlet 20 as a voltage.

For this purpose, the valve unit 10 comprises a first electrode 26 and a second electrode 28, the first electrode 26 being arranged in the fluid channel 16 upstream of the valve seat 14 and the second electrode 28 being arranged in the fluid channel 16 downstream of the valve seat 14.

By connecting the electrodes 26, 28 to a voltage measuring device, the potential between the electrodes 26, 28 can be measured.

In the embodiment illustrated in FIG. 1, the first electrode 26 is formed by the metallic fluid connection 19 which is arranged at the fluid inlet 18. In this way, it is not necessary to realize the first electrode 26 by a separate component. However, it is also possible to realize the first electrode 26 by a further component.

The fluid connection 19 protrudes with a thin, tubular extension 29 through the flanged housing 15 and ends at a maximum of 1.5 mm upstream of the valve seat 14 in the fluid housing 12, in particular 0.5 mm upstream of the valve seat 14, but preferably at least 0.25 mm before the valve seat 14.

The second electrode 28 is arranged in the fluid housing 12, the second electrode 28 surrounding in particular the valve seat 14.

Preferably, the second electrode 28 surrounds the valve seat 14 such that it does not matter in which direction the fluid flows through the valve unit 10, so that when connecting the valve unit 10, no attention needs to be paid to where the fluid inlet 18 and where the fluid outlet 20 are located.

In the embodiment illustrated in FIG. 1, the second electrode 28 is configured so as to be symmetrical and surrounds both an intake 36 to and a drain 38 out of the valve seat 14.

A recess 32 is present in the fluid housing 12 for an easier positioning of the second electrode 28.

For contacting the second electrode 28, the valve unit 10 has a contact element 34 which runs from the electrode 28 to an outside of the valve unit 10. The contact element 34 is for example a wire.

As can be seen in FIG. 1, a groove 40 in which the contact element 34 runs is formed in the flanged housing 15 on an outside facing the fluid housing 12.

In the embodiment illustrated in FIG. 1, the electrodes 26, 28 are mounted on the valve unit 10. However, it is also conceivable to integrate the electrodes 26, 28 firmly in the fluid housing 12 as inserts. For example, the electrodes 26, 28 can be inserted and insert-molded in a tool mold to produce the fluid housing 12.

A distance of the two electrodes 26, 28 from each other is at most 3 mm. Alternatively or additionally, a maximum distance of the individual electrodes 26, 28 from the valve seat 14 is at most 1.5 mm. Only this small distance of the electrodes 26, 28 enables a reliable measurement of the potential difference between the fluid inlet 18 and the fluid outlet 20.

A minimum distance between the electrodes 26, 28 is 0.5 mm, for example. An even smaller distance between the electrodes 26, 28 is theoretically possible, but tolerances in the positioning of the electrodes 26, 28 must also be taken into account. If the distance is too small, there is a risk of a short circuit between the electrodes 26, 28 in case of an unfavorable tolerance situation, and a potential measurement is no longer possible.

The fluid housing 12 is preferably made of a electrically non-conductive material and is in particular a plastic part, for example an injection molded part. As the fluid housing 12 and preferably also the flanged housing 15 are made of plastic, the electrodes 26, 28 are insulated from each other by the fluid housing 12, i.e. there is no need for a complex insulation of the electrodes 26, 28. In particular, the fluid is the only potential electrical conductor between the electrodes 26, 28.

The flanged housing 15 and the fluid connection 21 at the fluid outlet 20 are preferably also made of an electrically non-conductive material such as plastic.

To assemble the valve unit 10, the flanged housing 15, the fluid housing 12 and the second electrode 28 are stacked on top of each other and placed in a package under the drive unit 22 and firmly connected, in particular screwed, to the drive unit 22.

The fluid connections 19, 21 are for example pressed into the flanged housing 15 or screwed thereto upon mounting of the valve unit.

The two fluid connections 19, 21 are in particular configured so as to receive hose connections having a UNF screw connection.

The valve unit 10 shown in FIG. 1 serves only to illustrate a possible structure, but basically, the concept according to the invention may be applied to almost any valve.

FIG. 2 illustrates the principle of the creation of a potential difference, which can be measured according to the invention to detect a leakage, in particular when using fluids having a low conductivity of, for example, less than 500 µS/cm, by means of a greatly simplified partial representation of a valve unit 10 including a valve seat 14 and a valve closing element 24.

The same reference numerals are used for the components known from the above embodiments, and in this respect, reference is made to the previous explanations.

FIG. 2 shows the valve unit 10 in a slightly open position to illustrate a leakage.

The fluid housing 12 has negative charges 44 at its interface 42, in particular at the areas contacted by a medium.

The fluid contains positive charge carriers 46 and negative charge carriers 48.

If a leakage occurs at the valve seat 14, in particular a small gap, interactions occur between the negative charges 44 at the interface 42 of the fluid housing 12 and the charge carriers 46, 48 in the fluid. As a result, negative charge carriers 48 are retained in front of the gap due to repulsion forces, and positive charge carriers 46 can pass through the gap. This results in an accumulation of negative charge carriers 48 before the gap, i.e. upstream of the valve seat 14. After the gap, i.e. downstream of the valve seat 14, there is an increase in positive charge carriers 46 or a thinning of the negative charge carriers 48.

The accumulation of charge carriers 48 before the gap, which usually only occurs in the event of a leakage, allows a potential difference to be measured between the fluid inlet 18 and the fluid outlet 20.

As already described in connection with FIG. 1, the electrodes 26, 28 are provided for this purpose.

Figure 3:
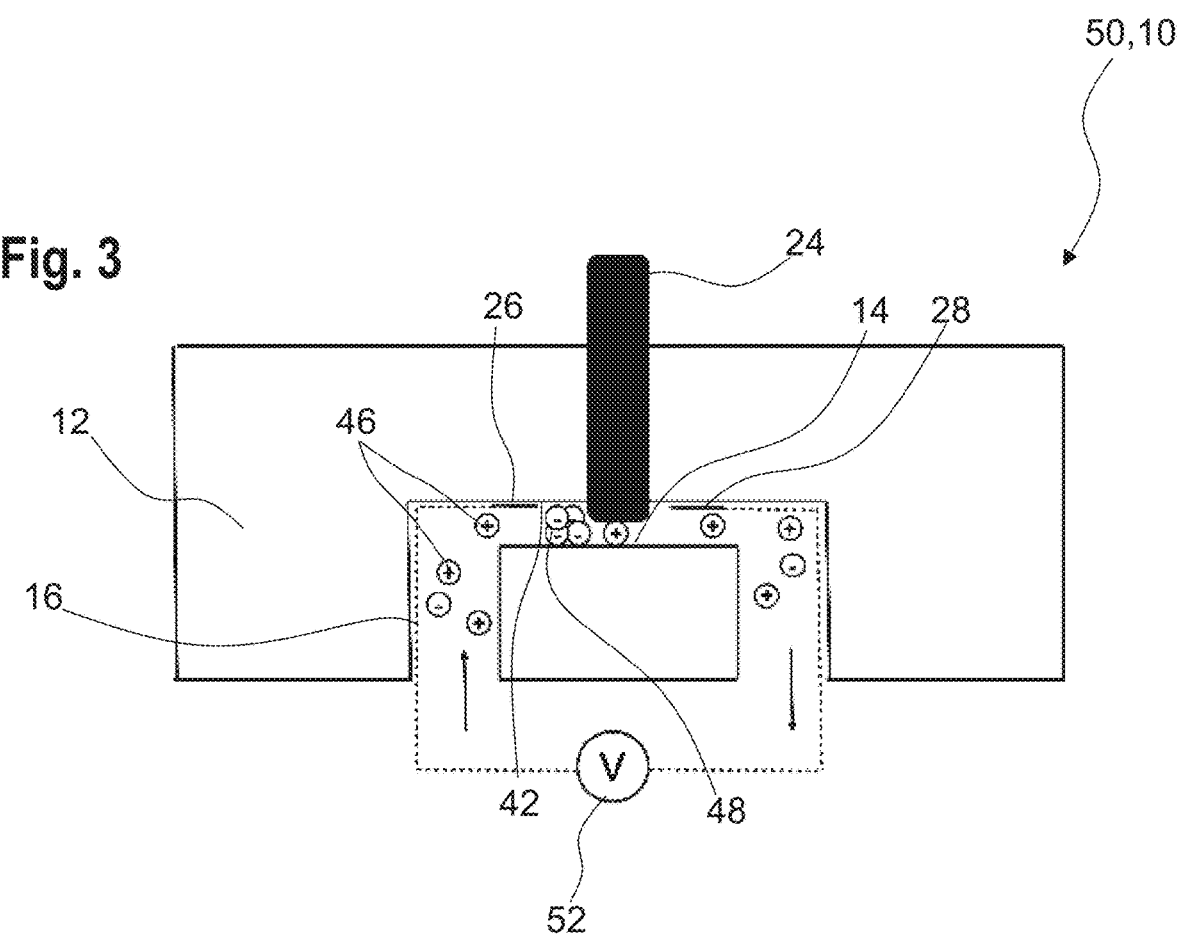

FIG. 3 additionally illustrates the functional principle by means of a greatly simplified partial representation of a valve assembly 50 according to the invention comprising a valve unit 10 according to the invention, which is for example configured like the valve unit 10 shown in FIG. 1.

FIG. 3 schematically illustrates the first electrode 26 upstream of the valve seat 14 and the second electrode 28 downstream of the valve seat 14.

The valve assembly 50 also includes a voltage measuring device 52 connected in an electrical circuit 54 between the first electrode 26 and the second electrode 28.

As already explained in connection with FIG. 2, there is an accumulation of negative charge carriers 48 before the gap and of positive charge carriers 46 after the gap when a leakage occurs.

In this case, a voltage can be measured between the electrodes 26, 28, which indicates the leakage.

In this case, the first electrode 26 acts as the anode and the second electrode 28 as the cathode.

No voltage can be measured in a closed or maximally open state of the valve unit 10, as in this case, there is no accumulation of equally charged charge carriers 46, 48 before or after the valve seat 14.

To promote the accumulation of charge carriers 46, 48 for the purpose of a voltage measurement in the event of a leakage, the areas of the fluid housing 12 which are contacted by a medium have a wall potential not equal to zero.

FIG. 2 shows negative charge carriers 44 at the interface 42, i.e. the parts of the fluid housing contacted by a medium are made of a material having a negative wall potential. Alternatively, the areas contacted by a medium can also be made of a material having a positive wall potential. In this case, positive charge carriers 46 would accumulate before the gap and negative charge carriers 48 after the gap.

A plastic having a negative wall potential is for example PMMA. Plastics having a positive wall potential are for example nylon or polyamides.

A further possibility to favor the accumulation of charge carriers 46, 48 for the purpose of voltage measurement in case of a leakage is the use of plastics comprising glass fibers. It is thus also possible to use neutrally charged polymers such as PEEK to produce the fluid housing 12. In particular, the areas of the fluid housing 12 contacted by a medium can be made of a glass-fiber reinforced plastic.

The conductivity can be determined with an identical structure of the valve unit 10 by connecting a conductivity measuring device to the two electrodes 26, 28 instead of a voltage measuring device 52.

Figure 4:
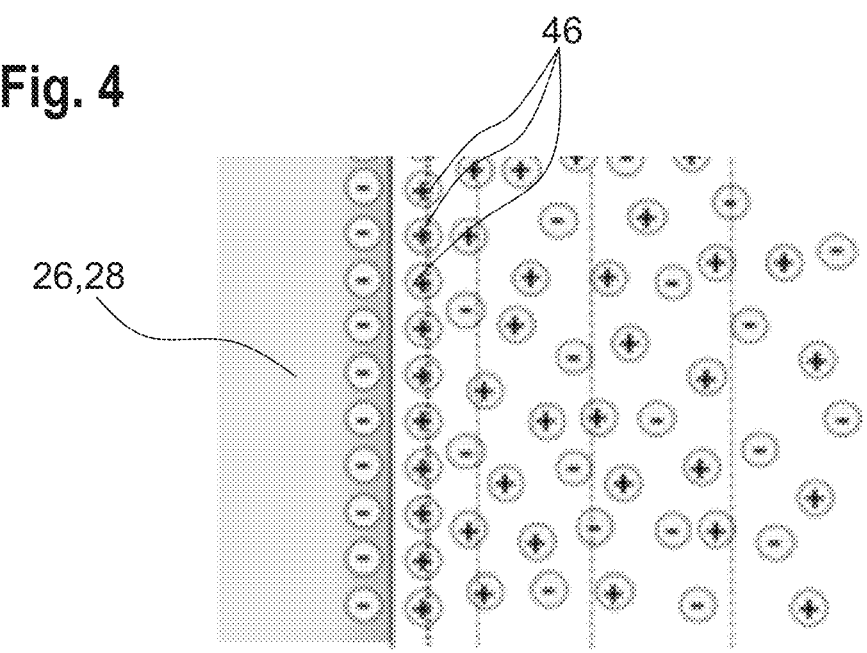

FIG. 4 illustrates the electrical double layer which is advantageous for the measuring principle. The electrical double layer forms at a phase boundary on the fluidic side. The phase boundary can be a solid, another liquid or a gas.

Typically, there are two charge layers opposite each other at the phase boundary in the charged state, which, as in a capacitor, have opposite signs.

The double layer is composed of a rigid layer and of a diffuse layer.

FIG. 4 shows an example of a solid body where positive charge carriers 46 accumulate in the fluid.

The wall potential decreases over the path length d of the entire double layer. The path length is often referred to as the Debye length. The Debye length depends, among other things, on the ion concentration of the fluid and can be several 100 μm in de-ionized water.

The so-called zeta potential is located at the beginning of the diffuse layer d, where the charge carriers 46, 48 are mobile in the fluid. The zeta potential (also ζ potential) is the electrical potential at the shear layer of a moving particle in a suspension.

Figure 5:
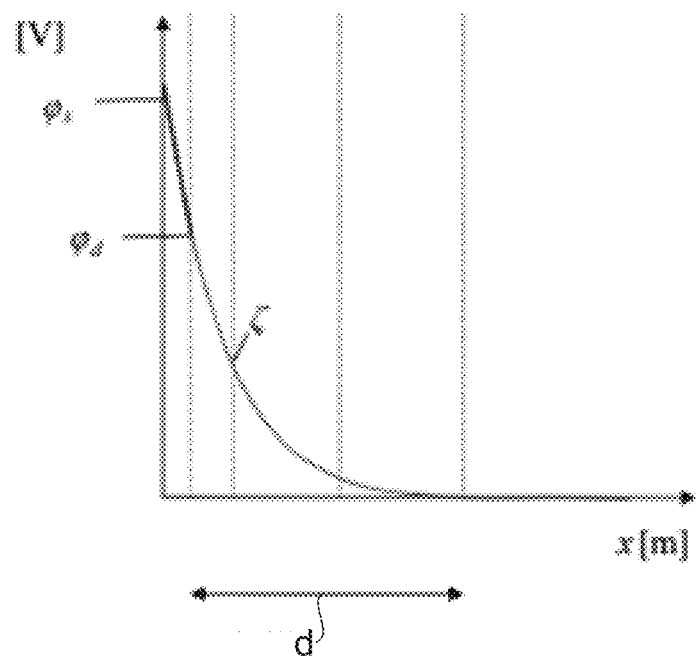
FIG. 5 shows a diagram for illustrating a potential difference.

FIG. 5 illustrates a potential difference and a ion concentration as a function of the distance from the surface of a charged particle suspended in a dispersion medium.

Figure 6:
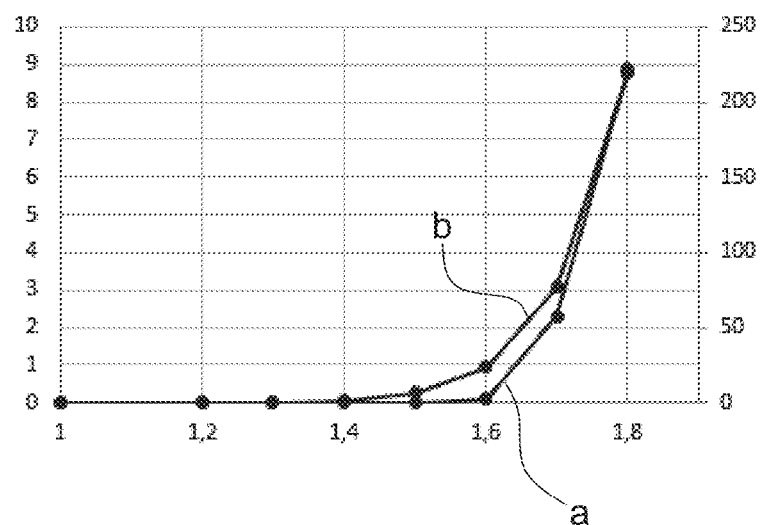
FIG. 6 shows the course of a measured potential difference relative to an occurring leakage when dosing a fluid having a low conductivity.

FIG. 6 illustrates a leakage in a valve unit 10 in the form of a flow (curve a) and in parallel the measured voltage (curve b). The measured voltage in volts is plotted on the left ordinate.

The fluid used is a 5 μM tris/borate solution having a conductivity of 1.5 μS/cm and a pH value of 8.

The leakage is in particular simulated by a defined opening of the valve unit 10 by applying an actuator voltage to the valve unit 10, in particular to the drive unit 22, causing a gap between the valve closing element 24 and the valve seat 14. The actuator voltage in volts is plotted on the abscissa of the diagram.

With higher actuator voltage, the degree of opening of the valve unit 10 increases, i.e. as the actuator voltage increases, the gap becomes larger and the leakage increases. A flow rate through the valve unit in μl/min is plotted on the right ordinate of the diagram. At an actuator voltage of 1.8, a flow of 225 μl/min in particular occurs.

In the potential course illustrated in FIG. 6, it can be seen that a course of the potential correlates strongly with the course of the leakage. This means that a leakage at the valve seat 14 can be derived from the measured potential difference.

Consequently, in accordance with a method according to the invention, a closed state of a valve unit 10 when dosing fluids, a voltage between the two electrodes 26, 28 of the valve unit 10 can be measured and a leakage of the valve unit 10 can be derived from the measured voltage.

The course of the measured potential also allows a conclusion to be drawn about the flow velocity of the fluid. Accordingly, the flow velocity could also be measured.

Figure 7:
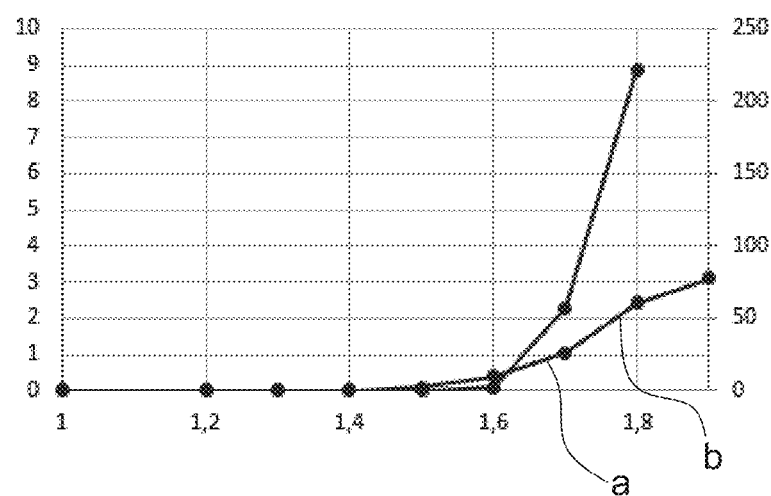
FIG. 7 shows the course of a measured potential difference relative to a leakage occurring when dosing a fluid having a conductivity higher than that of the fluid illustrated in FIG. 5.

FIG. 7 illustrates a further course of a measured potential as a function of a leakage in a valve unit 10. In contrast to the graph shown in FIG. 6, a 500 μM tris/borate solution having a conductivity of 26.4 μS/cm was used for the course shown in FIG. 7.

As can be seen from FIG. 7, the measurable potential difference is lower for a higher concentrated solution than for a low concentrated solution. Comparing the voltage values to the above solutions at an actuator voltage of 1.8 V and the same flow, a value of 9 V is obtained with the lower concentrated solution compared to 2.5 V with the higher concentrated solution.

This means that the method according to the invention of measuring a leakage on the basis of a potential difference is particularly suitable for fluids having a low ion concentration and a low conductivity, for example for fluids having an electrical conductivity of less than 500 μS/cm, in particular of less than 50 μS/cm.

At a higher ion concentration, it may be more advantageous to measure the conductivity.

Figure 8:
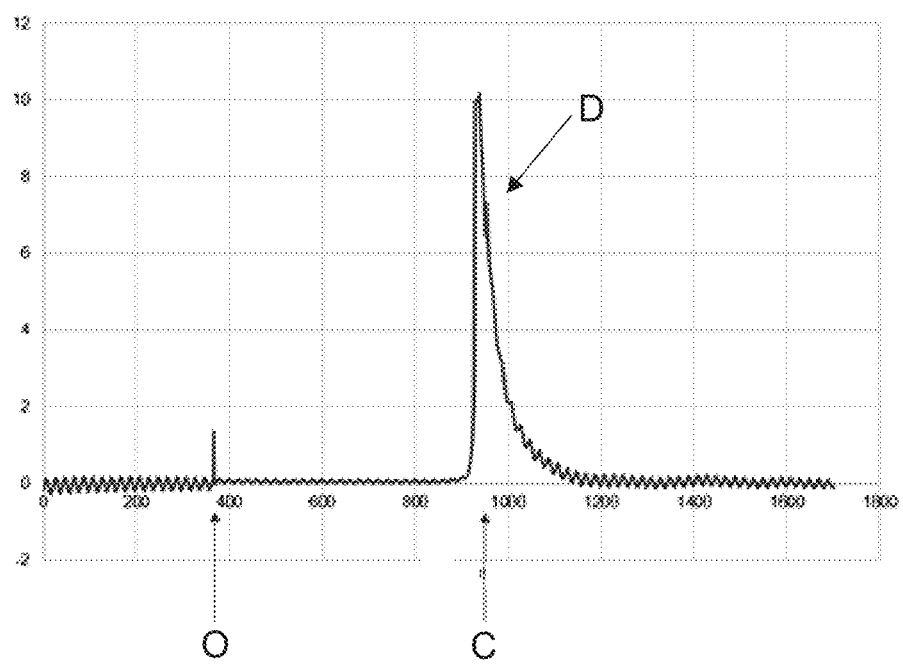
FIG. 8 shows the course of a measured potential difference during operation of a valve unit according to the invention.

FIG. 8 illustrates the course of a measured potential during operation of a valve unit 10 according to the invention. FIG. 8 in particular shows a potential difference over the time course of a valve circuit.

The potential rises briefly at the moment of the valve opening O.

At the moment of the valve closing C, a higher signal is produced as the closing process by a mechanical return spring is slower than the opening process by the drive unit 22.

Further information can be obtained from the course of the potential. For example, the course can be used to derive the quality of an actuator used.

A possible kickback of the valve closing element 24 can also be detected, more specifically by a double peak D.

After valve opening O, when the valve unit 10 is open to the maximum, no accumulation of charge carriers is possible, and no potential difference can be formed until closing C.

To allow a potential difference to form, a gap between the valve seat 14 and the valve closing element 24 is preferably smaller than a Debye length.

The invention claimed is:

1. A valve unit for dosing fluids which has
    a fluid housing including a valve seat,
    a fluid channel extending from a fluid inlet to the valve seat and from the valve seat to a fluid outlet,
    a movably mounted valve closing body for controlling or regulating a flow through the fluid channel, and
    a first electrode and a second electrode, wherein the first electrode is arranged in the fluid channel upstream of the valve seat and the second electrode is arranged in the fluid channel downstream of the valve seat, wherein a distance of the two electrodes from each another is at most 3 mm and/or a maximum distance of the individual electrodes from the valve seat is at most 1.5 mm, wherein the valve unit has a metallic fluid connection arranged at the fluid inlet, the fluid connection forming the first electrode.

2. The valve unit according to claim 1, wherein the distance between the two electrodes is at least 0.3 mm.

3. The valve unit according to claim 1, wherein the areas of the fluid housing contacted by a medium are made of a glass-fiber reinforced plastic.

4. The valve unit according to claim 1, wherein the fluid connection projects into the fluid housing and terminates at maximum 1.5 mm upstream of the valve seat.

5. The valve unit according to claim 1, wherein the fluid housing comprises a recess for receiving the second electrode.

6. The valve unit according to claim 1, wherein the first electrode and/or the second electrode are firmly integrated in the fluid housing as inserts.

7. The valve unit according to claim 1, wherein the valve unit has a contact element for contacting the first and/or the second electrode, which extends from the electrode to an outside of the valve unit.

8. The valve unit according to claim 1, wherein the second electrode surrounds the valve seat.

9. The valve unit according to claim 1, wherein the areas of the fluid housing contacted by a medium are made of an electrically non-conductive material which has a wall potential not equal to zero.

10. The valve unit according to claim 9, wherein wall potential comprises a negative wall potential.

11. A valve assembly including
    a valve unit for dosing fluids which has
    a fluid housing including a valve seat,
    a fluid channel extending from a fluid inlet to the valve seat and from the valve seat to a fluid outlet,
    a movably mounted valve closing body for controlling or regulating a flow through the fluid channel, and
    a first electrode and a second electrode, wherein the first electrode is arranged in the fluid channel upstream of the valve seat and the second electrode is arranged in the fluid channel downstream of the valve seat, wherein a distance of the two electrodes from each another is at most 3 mm and/or a maximum distance of the individual electrodes from the valve seat is at most 1.5 mm, and
    a voltage measuring device which is connected in an electrical circuit between the first electrode and the second electrode, wherein the valve unit has a metallic fluid connection arranged at the fluid inlet, the fluid connector forming the first electrode.

12. A valve unit for dosing fluids which has
    a fluid housing including a valve seat,
    a fluid channel extending from a fluid inlet to the valve seat and from the valve seat to a fluid outlet,
    a movably mounted valve closing body for controlling or regulating a flow through the fluid channel, and
    a first electrode and a second electrode, wherein the first electrode is arranged in the fluid channel upstream of the valve seat and the second electrode is arranged in the fluid channel downstream of the valve seat, wherein a distance of the two electrodes from each another is at most 3 mm and/or a maximum distance of the individual electrodes from the valve seat is at most 1.5 mm, and wherein the second electrode surrounds the valve seat.

13. The valve unit according to claim 12, wherein the distance between the two electrodes is at least 0.3 mm.

14. The valve unit according to claim 12, wherein the fluid housing comprises a recess for receiving the second electrode.

15. The valve unit according to claim 12, wherein the first electrode and/or the second electrode are firmly integrated in the fluid housing as inserts.

16. The valve unit according to claim 12, wherein the valve unit has a contact element for contacting the first and/or the second electrode, which extends from the electrode to an outside of the valve unit.

17. The valve unit according to claim 12, wherein the areas of the fluid housing contacted by a medium are made of an electrically non-conductive material which has a wall potential not equal to zero.

18. The valve unit according to claim 12, wherein the areas of the fluid housing contacted by a medium are made of a glass-fiber reinforced plastic.

* * * * *